(12) United States Patent
Zhang (10) Patent No.: US 6,749,950 B2
(45) Date of Patent: Jun. 15, 2004

(54) EXPANDED GRID

(75) Inventor: Lu Zhang, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 141 days.

(21) Appl. No.: 10/109,382

(22) Filed: Mar. 28, 2002

(65) Prior Publication Data

US 2003/0183312 A1 Oct. 2, 2003

(51) Int. Cl.[7] .............................. H01M 4/16; H01M 4/74
(52) U.S. Cl. ....................... 428/596; 148/400; 148/706; 29/623.1; 29/6.1; 429/225; 429/226
(58) Field of Search .................. 428/596; 148/706, 148/400; 29/6.1, 6.2, 623.1; 429/225, 226

(56) References Cited

U.S. PATENT DOCUMENTS

| | | | |
|---|---|---|---|
| 2,060,534 A | * 11/1936 | Singleton et al. | 420/572 |
| 3,959,016 A | * 5/1976 | Tsuda | 29/2 |
| 4,629,516 A | * 12/1986 | Myers | 148/706 |
| 6,086,691 A | * 7/2000 | Lehockey et al. | 148/706 |
| 6,291,097 B1 | 9/2001 | Barker et al. | |
| 6,342,110 B1 | * 1/2002 | Palumbo | 148/400 |
| 6,419,712 B1 | 7/2002 | Haverstick | |
| 6,454,977 B1 | 9/2002 | Kwok et al. | |
| 6,468,318 B1 | 10/2002 | Meadows et al. | |
| 2002/0088515 A1 | * 7/2002 | Aust et al. | 148/706 |

FOREIGN PATENT DOCUMENTS

| | | | |
|---|---|---|---|
| JP | 60-000062 | * | 1/1985 |
| JP | 60-009061 | * | 1/1985 |

* cited by examiner

Primary Examiner—John J. Zimmerman
(74) Attorney, Agent, or Firm—Jimmy L. Funke (57) ABSTRACT

Provided for herein is a method of making an expanded metal grid, comprising: compression rolling a metal strip at a reduction ratio from about 1.25 to 1, to about 25 to 1 to produce a rolled strip, heating the rolled strip at a temperature of at least about 125° C., and at most about 325° C. for at least about 30 seconds, to produce a heat treated metal strip having an equiaxial grain structure within; and expanding the heat treated metal strip to produce the expanded metal grid.

33 Claims, 6 Drawing Sheets

EXPANDED GRID

BACKGROUND OF THE INVENTION

Electrochemical storage batteries, and in particular, lead sulfuric acid storage batteries are ubiquitous in automotive applications. These batteries have electrochemical cells developing about 2.25 Volts each. A generic lead acid battery cell has a positive plate, a negative plate, and an electrolyte, typically aqueous sulfuric acid. The plates are held in a parallel orientation and electrically isolated by a porous separator to allow free movement of charged ions. Generally, six of these cells are connected in series to produce the 12 Volts (12 V) common in automobile systems.

The positive battery plate (also known as a positive electrode) contains a current collector (i.e., a metal plate or grid, hereinafter grid), covered with a layer of positive active material (hereinafter PAM) on the surface. PAM is essentially all electrically conductive lead dioxide ($PbO_2$). The negative battery plate contains a current collector (grid), and it is covered with a negative active material, typically spongy lead.

Lead acid battery cells are quite unique because the electrolyte actively participates in the energy storage and release process, as represented schematically in Equations 1, 2, 3, and 4 below:

| | | |
|---|---|---|
| Electrolyte | $H_2SO_4 \rightleftharpoons H^+ + HSO_4^-$ | Equation 1 |
| Negative Electrode | $Pb_{(metal)} + HSO_4^- \underset{Charge}{\overset{Discharge}{\rightleftharpoons}} PbSO_4 + H^+ + 2e^-$ | Equation 2 |
| Positive Electrode | $PbO_2 + 3H^+ + HSO_4^- + 2e^- \underset{Charge}{\overset{Discharge}{\rightleftharpoons}} PbSO_4 + 2H_2O$ | Equation 3 |
| Total Reaction | $Pb_{(metal)} + PbO_2 + 2H_2SO_4 \underset{Charge}{\overset{Discharge}{\rightleftharpoons}} 2PbSO_4 + 2H_2O$ | Equation 4 |

Discharge within the electrochemical cell results in lead metal (Pb) supplied by the negative plate reacting with the ionized sulfuric acid electrolyte to form lead sulfate ($PbSO_4$) on the surface of the negative plate (see Equation 2). Discharge also results in the $PbO_2$ located on the positive plate being converted into $PbSO_4$ on or near the positive plate. Charging of the battery cell (via an electron supply from an external electrical current) converts $PbSO_4$ into spongy lead metal on the surface of the negative plate, and converts $PbSO_4$ into $PbO_2$ (PAM), on the surface of the positive plate. In effect, charging converts $PbSO_4$ into PAM and lead metal; discharging releases the stored electrical potential by converting PAM and lead metal back into $PbSO_4$.

Accordingly, it is important to battery performance that the PAM be in physical and electrical contact with the positive plate. As such, the PAM must be supported by, adhered and/or attached to, and in electrical communication with the positive grid for the battery to function properly. Separation of PAM from the positive plate results in poor battery performance and ultimately in battery failure, which is defined herein as a battery no longer suitable for its intended purpose.

Factors that affect battery performance include the chemical make-up of the positive grid, the geometric configuration of the positive grid, and the method by which the grid is converted (i.e., processed) into a positive plate. Chemically, battery grids are lead containing alloys. The geometry (i.e., spatial arrangement) of a grid depends on the method by which the grid is made. Conversion of a grid into a positive battery plate involves a series of process steps. Historically, this process includes pasting, steaming, curing, pickling, and/or forming.

In pasting, water, sulfuric acid, lead and lead oxides, among other materials are applied to the grid surface as a paste. The pasted grid may then be steamed (e.g., 100° C. and 100% humidity) to facilitate crystal growth within the paste. The pasted grid is then cured at controlled temperature and humidity conditions to "set" the paste, wherein the paste is chemically transformed into sulfates, hydroxides, and other lead compounds through a series of complex hydration reactions requiring the presence of water. These reactions take place within the paste itself, and between the paste and the grid to produce a "corrosion layer" at the interface between the grid and the paste. This corrosion layer will subsequently provide both physical and electrical communication between the grid, and the later formed PAM.

Once cured, grids are assembled into a battery package and a charging electrolyte is added. The grids are "pickled" by allowing them to stand for a period of time in contact with the charging electrolyte. Next, the grids are "formed" by passing an external electric current through the cell. In forming, a majority, if not all of the paste on the positive plate is converted into PAM. The charging electrolyte is then replaced with shipping electrolyte to render the battery ready for use.

Phenomena that have a negative effect on battery performance include fractures in the PAM layer due to stress introduced as the layer accumulates on the positive plate during charging. The metal grid also reacts with the sulfuric acid electrolyte through pores, cracks, or holes in the corrosion layer to destroy the interface between the grid and the PAM. Such grid corrosion breaks both electrical communication and physical contact (i.e., support) between the grid and the layer of PAM.

Also, lead contained within the positive grid can be oxidized to form the corrosion layer of combined lead oxide (PbO) and lead dioxide on the surface of the grid according to Equation 5 below:

$Pb_{(metal)} + H_2O \rightarrow PbO$  Equation 5

PbO formation renders the corresponding portion of the grid surface non-conductive, and also negatively impacts support of the PAM layer. Accordingly, these phenomena, either alone or in combination, result in decreased battery performance (i.e., the cell losing its capacity to transfer and store electrical energy), eventually leading to battery failure. Furthermore, while these phenomena are significant at room temperature, they become even more significant at higher operational temperatures.

The rate at which a chemical process proceeds is proportional to temperature. In general, the higher the temperature, the faster the reaction rates within the lead acid battery cell (i.e., the higher the temperature, the more PAM that forms, the more PbO that can form, and the more corrosion of the grid that can take place). Positive grid corrosion becomes particularly significant under "high temperature" conditions (defined herein as above 50° C.), which have become common in automotive applications as "under hood temperatures" rise due to automotive design trends and space limitations.

Another temperature driven phenomenon detrimental to battery performance is PAM separation that results from dissimilar thermal expansion coefficients between the PAM layer and the underlying grid. Typically, the grid expands faster than does the PAM, causing the PAM layer to crack, rupture and separate, which serves to exacerbate grid corrosion.

Accordingly, it is desirable to reduce or substantially eliminate high temperature effects on lead acid battery plates. In particular, to provide a longer useful-lifetime of the battery, preferably utilizing materials and processes that provide an economic incentive in doing so.

SUMMARY OF THE INVENTION

Provided for herein is a method of making an expanded metal grid, comprising: compression rolling a metal strip at a reduction ratio from about 1.25 to 1, to about 25 to 1 to produce a rolled strip, heating the rolled strip at a temperature of at least about 125° C., and at most about 325° C. for at least about 30 seconds, to produce a heat treated metal strip having an equiaxial grain structure within; and expanding the heat treated metal strip to produce the expanded metal grid.

Also provided for is a method of making an expanded metal grid, comprising: compression rolling a metal strip at a reduction ratio between about 1.25 to 1, and 25 to 1 to produce a rolled metal strip, expanding the rolled metal strip to produce an expanded metal grid; and heating the expanded metal grid at a temperature between about 125° C., and about 325° C. for at least about 30 seconds to produce an equiaxial grain structure within the, metal grid.

BRIEF DESCRIPTION OF THE DRAWINGS

The improved electrode will now be described, by way of example, with reference to the accompanying drawings, which are meant to be exemplary, not limiting, and wherein like elements are numbered alike in several figures.

DETAILED DESCRIPTION OF THE INVENTION

It has been discovered that a battery grid, having improved high temperature performance can be obtained by expanding a compression rolled metal strip that has been heat treated at a temperature, and for a period of time sufficient to produce an equiaxial grain structure within the metal strip. It has also been discovered that a battery grid having improved high temperature performance can be obtained by expanding a compression rolled metal strip into a grid, followed by heat treating the expanded grid at a temperature, and for a period of time sufficient to produced an equiaxial grain structure within the grid material.

Figure 1:
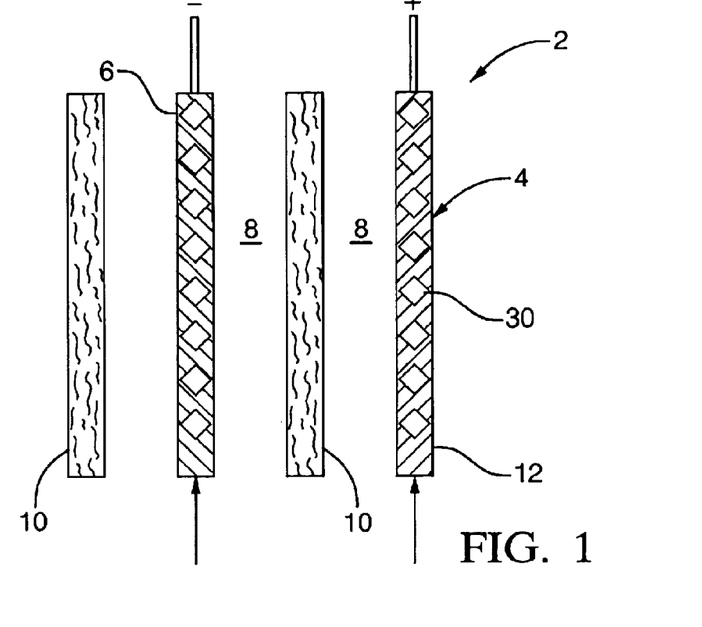
FIG. 1 is an expanded view of a cross-section of a lead acid cell.
Figure 2:
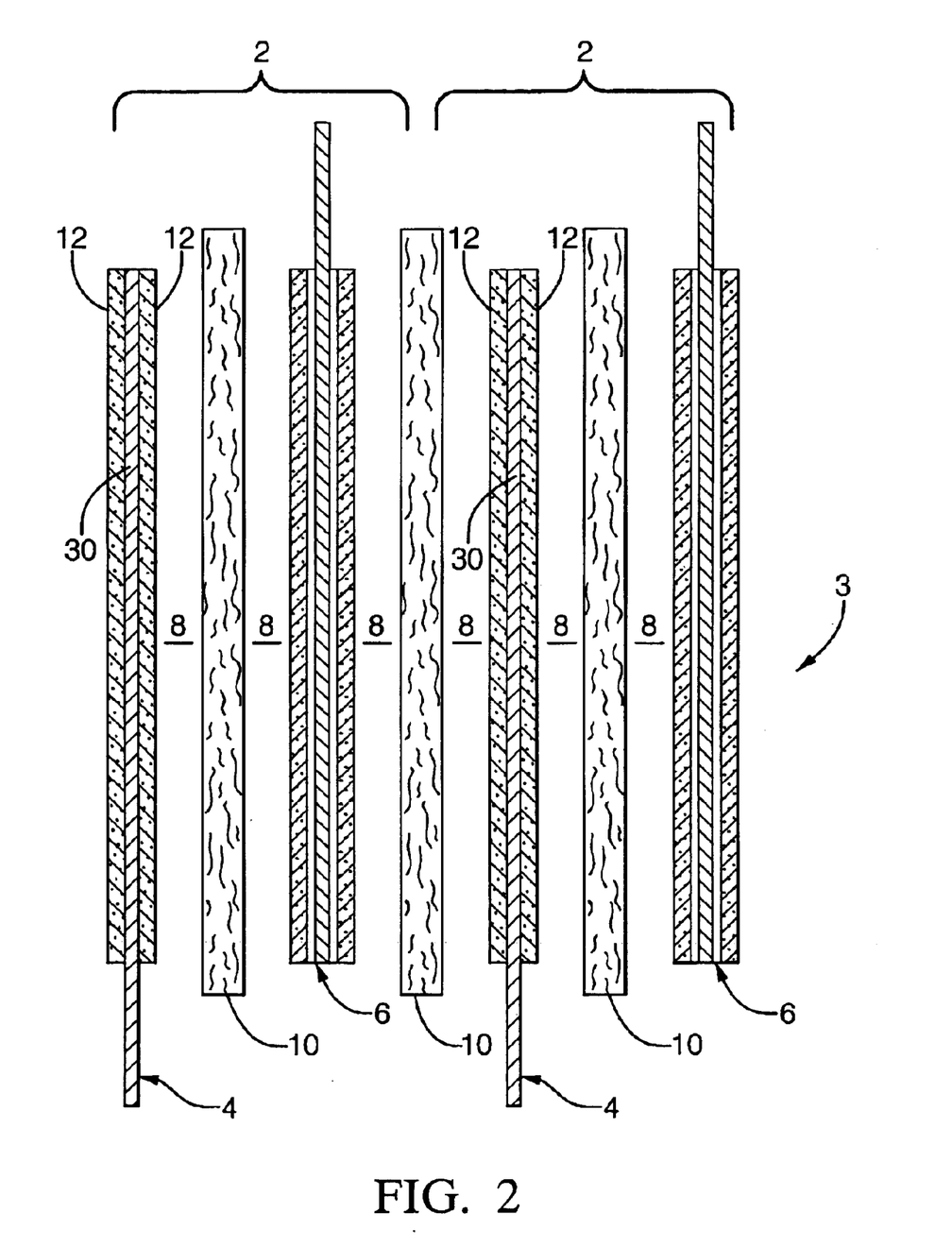
FIG. 2 is an expanded view of a lead acid battery using the cell of FIG. 1.

FIG. 1 depicts a generic lead acid battery cell 2, including a positive plate 4, a negative plate 6, and an electrolyte 8, which in this case is aqueous sulfuric acid. The plates are held substantially parallel and electrically isolated by a porous separator 10 to allow free movement of charged ions. The positive active mass (PAM) 12 is adhered to the surface of the grid 30. FIG. 2 depicts a lead acid battery 3 having a plurality of the cells shown in FIG. 1.

Figure 3:
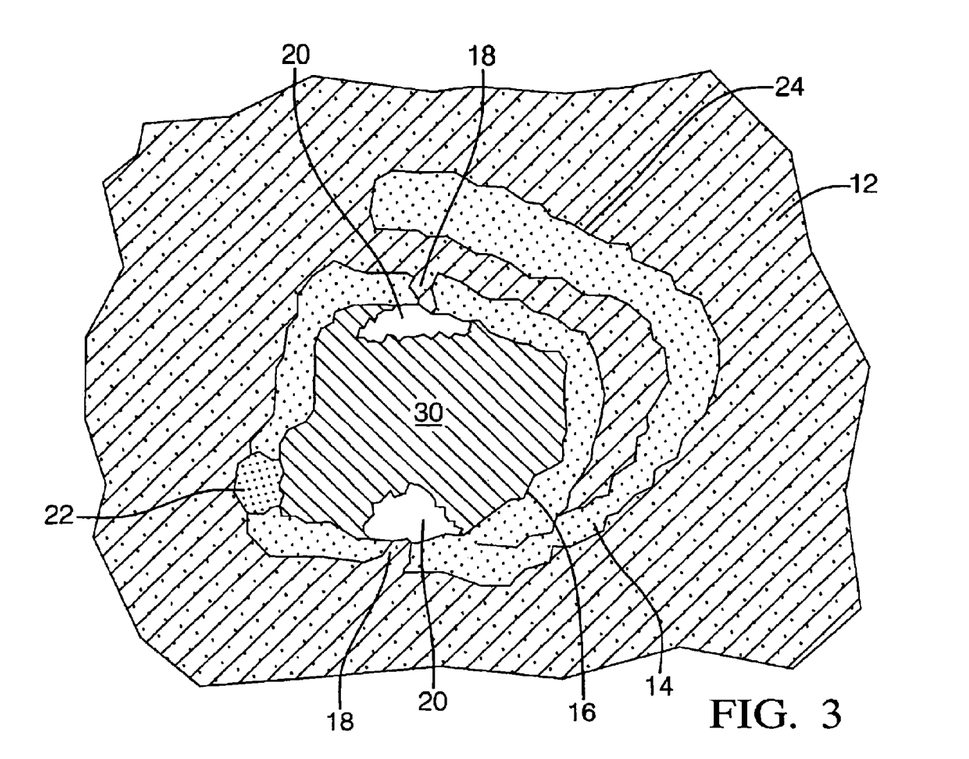
FIG. 3 is a cross sectional view of a Comparative Example electrode.

FIG. 3 depicts a cross section of a positive plate 4 produced by the above-described historical process, wherein a corrosion layer 14 covers grid 30 at interface 16, and adhered to corrosion layer 14 is a layer of PAM 12. Also present in FIG. 3 is a fracture line 24, PbO deposits 22, along with pores, cracks, and/or holes 18 in corrosion layer 14. Accordingly, the detrimental effects of grid corrosion and thermal expansion illustrated in FIG. 3 result in PAM separation and eventually in battery failure.

A suitable grid has high electrical conductivity, mechanical strength sufficient to support the PAM, resistance to corrosion in sulfuric acid, and acceptable processability in formation of the grid. It has been discovered that grid composition and grid formation, both individually and in combination, affect the suitability of a grid. Specifically, while the properties of pure lead render it unacceptable for use as a grid material by itself (because pure lead grids simply fall apart during use), alloys of lead can be selected to impart the desired properties lacking in pure lead alone.

Alloying metals include antimony (Sb), tin (Sn), silver (Ag), gold (Au), and calcium (Ca). Antimony alloys have been found to hydrolyze water during charging of the battery. Noble metal alloys (i.e., silver, gold and the like) improve grid conductivity and corrosion resistance. Accordingly, in one embodiment, the grid material does not contain antimony and is noble metal free. "Noble metal free" is defined herein as essentially free of noble metals in that while noble metals may naturally occur in trace amounts within the metal alloy, they are not intentionally added to the composition. In another embodiment, Ag is present in the lead alloy to improve conductivity and strength.

Sn and Ca are used to impart conductivity, strength and processability into the lead alloy, and do so without deleterious side effects. Thus, the preferred alloy for use herein includes lead, tin, and calcium (Pb—Sn—Ca). Preferably, the alloy includes an upper weight percent of lead (Pb Wt %) of about 99.5, with an upper Pb Wt % of about 99 desired, and an upper Pb Wt % of about 98.5 more desired. A lower Pb Wt % of about 95 can be employed, with a lower Pb Wt % of about 97.5 desired, and a lower Pb Wt % of about 98.3 more desired. Also, the alloy includes an upper weight percent of tin (Sn Wt %) of about 20, with an upper Sn Wt % of about 1.5 desired, and an upper Sn Wt % of about 1.0 more desired. A lower Sn Wt % of about 0.1 can be employed, with a lower Sn Wt % of about 0.5 desired, and a lower Sn Wt % of about 1.0 more desired. In addition, the alloy includes an upper weight percent of calcium (Ca Wt %) of about 0.1, with an upper Ca Wt % of about 0.075 desired, and an upper Ca Wt % of about 0.04 more desired. A lower Ca Wt % of about 0.01 can be employed, with a lower Ca Wt % of about 0.02 desired, and a lower Ca Wt % of about 0.03 more desired. A more preferred alloy composition includes about 98.0 wt % Pb, about 1.5 Wt % Sn, and about 0.08 Wt % Ca.

When Ag is present, the alloy includes an upper weight percent of silver (Ag Wt %) of about 0.1, with an upper Ag Wt % of about 0.08 desired, and an upper Ag Wt % of about 0.05 more desired. A lower Ag Wt % of about 0.01 can be employed, with a lower Ag Wt % of about 0.02 desired, and a lower Ag Wt % of about 0.04 more desired. A more preferred Ag containing alloy composition includes about 99.4 wt % Pb, about 0.5 Wt % Sn, about 0.04 Wt % Ca, and about 0.04 wt % Ag.

Various processes may be used to form the grid including, for example, casting, punching, and expanding metal. In casting, molten lead alloy, often containing Sb to improve castability, is fed into molds to produce a grid without significant mechanical fabrication. Punching uses a die to cut a desired shape out of a lead alloy strip. Both casting and punching result in a relatively dense grid having strength adequate for use in lead acid batteries (i.e., they provide support for the PAM). However, both processes are costly, time consuming, and may require alloys inconsistent with optimal battery performance such as those containing antimony.

The use of expanded metal techniques includes making partial cuts in a metal strip, and then stretching (i.e., expanding) the strip normal to the cuts to produce the desired grid shape. The tools and machinery required are expensive, the process is intricate, and the grids formed have strength normal to the direction in which the expansions were made, but not along the so-called "flow lines" that result parallel with the expansion event.

However, the advantages of expanded metal grids include no physical removal of material, the grids are lighter, and have a higher surface area than grids made by the other two methods. Accordingly, expanded metal grids are preferred for use herein.

Figure 9:
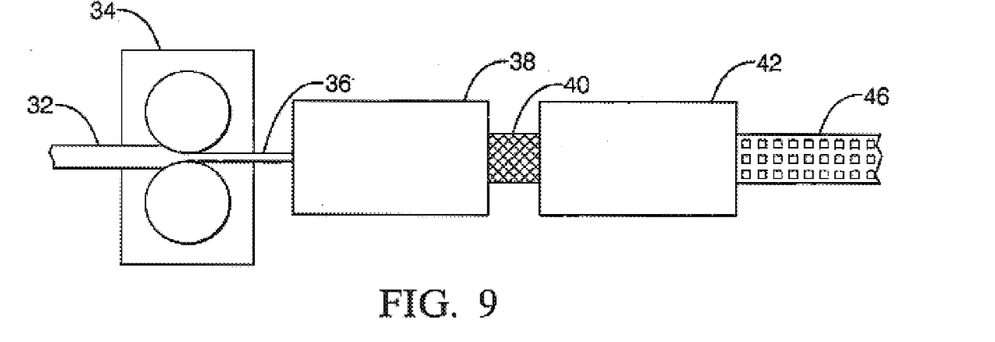
FIG. 9 is a schematic representation of the process described herein.

The improvement in the high temperature performance of lead acid batteries described herein results from the grids being expanded from metal strips that have been compression rolled and heat-treated prior to expanding (see FIG. 10), or in another embodiment, the metal strips are compression rolled, expanded, and the grid is heat treated (shown schematically in FIG. 9).

The metal strips used may be cut, punched, cast, or any combination comprising one of the aforementioned processes. Preferably, the metal strips are cast. Next, the metal strips are compression rolled. By compression rolled, it is meant an external force is applied to the strips, with or without heat, in a predefined amount termed the compression ratio, which is expressed as the ratio of the amount incoming material thickness is to be reduced (i.e., a factor of X to "one". For example, a compression ratio of 10 to 1 (10:1) reduces the thickness of the material by a factor of 10, or 90% rolling reduction.

Preferably, the metal strips useful herein are "cold rolled" (i.e., without the application of heat) to a compression ratio of at least about 1.25 to 1, preferably at least about 1.5:1, with a reduction ratio of at least about 3:1 being most preferred. Also, the metal strips are preferably compression rolled at a compression ratio of at most about 25:1, with a compression ratio of at most about 10:1 being preferred, and a compression ratio of at most about 5:1 being most preferred.

As used herein, heat-treating includes subjecting the material to a temperature, for a period of time sufficient to produce an equiaxial (interconnected) grain structure within the metal grid itself.

In particular, heat-treating includes heating the metal strip and/or the expanded grid at a temperature at least about 100° C., with a temperature at least about 125° desired, and a temperature at least about 150° C. more desired. In practice, the upper heat treating temperature is limited by the melting and/or softening point of the metal grid itself, as such, an upper temperature of at most about 325° can be employed, with an upper temperature of at most about 300° C. desired, and an upper temperature of at most about 240° C. more desired to avoid unwanted deformations of the grid.

In combination with temperature is the period of time required to produce the equiaxial grain structure within the metal grid itself. The time required to produce an equiaxial grain structure being a function of the metal grid composition, as well as other conditions including, for example, the use of different heat transfer mediums, (inert gas, reactive gas, air, oil, sand and the like), discrete temperature cycles and/or temperature programming including the controlled ramping of the temperature up or down, over at least one discrete temperature range, over at least one discrete time interval, for a determined number of times each, all of which are readily determined by one of skill in the art without undue experimentation.

At the above temperature limits, a time at least about 30 seconds can be employed, with a time of at least about 1 minute desired, and a time of at least about 5 minutes more desired. An upper time limit of at most about 72 hours, preferably at most about 24 hours, with an upper time limit of at most about 2 hours being more desired.

In one embodiment, the metal strip and/or expanded grid is heat treated on a continuous basis. In another embodiment, the metal strip and/or expanded metal grid is heat treated step wise or in a batch type process.

Heat treating of the metal strip and/or the expanded metal grid also affects the tensile strength of the material. The metal strip and/or expanded metal grid may be heat treated to a tensile strength at least about 2,500 pounds per square inch (psi), preferably at least about 3,500 psi, with a tensile strength of at least about 4,000 psi being more preferred. Also, the metal strip and/or expanded metal grid may be heat treated to a tensile strength at most about 8,000 psi, preferably at most about 6,000 psi, with a tensile strength of at most about 5,000 psi being more preferred.

Furthermore, the equiaxial grain structure of the compression rolled, heat-treated metal strip and/or expanded metal grid as described herein has an average grain size of at least about 50 microns, preferably at least about 100 microns, with an average grain size of at least about 150 microns being more preferred. The grid preferably has an average grain size of at most about 500 microns, preferably at most about 300 microns, with an average grain size of at most about 200 microns being more preferred.

Figure 4:
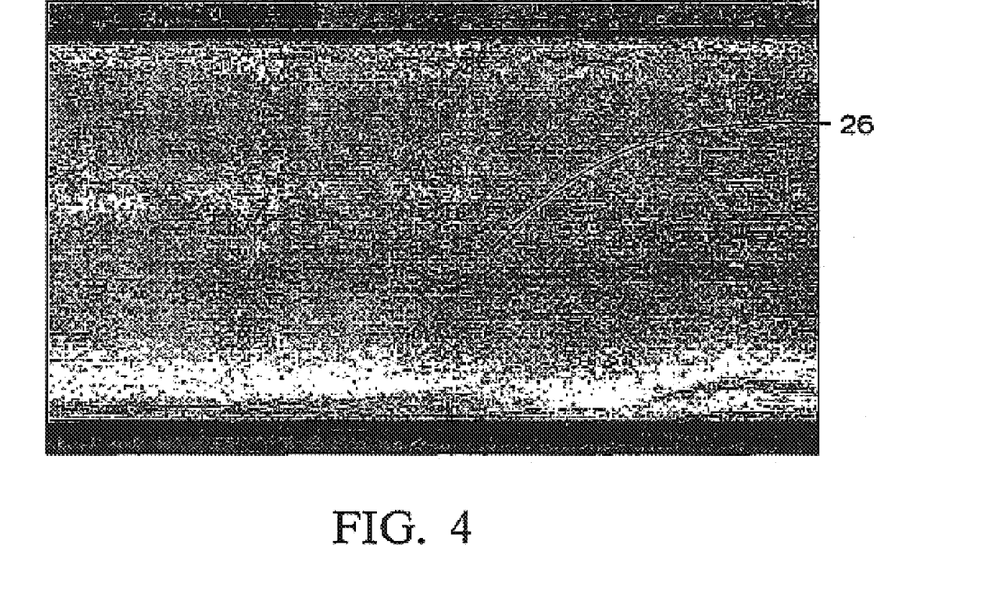
FIG. 4 is a 50× microscopic view of a Comparative wrought lead alloy metal strip.
Figure 5:
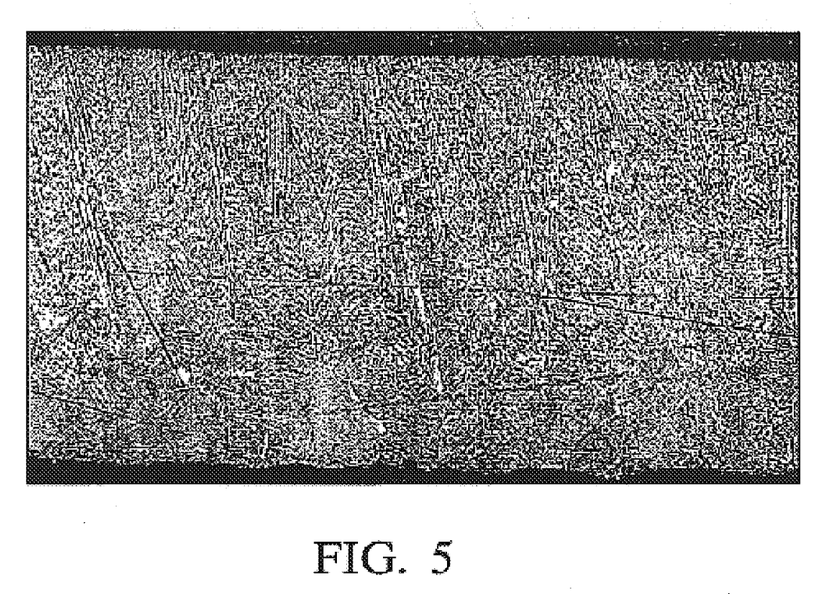
FIG. 5 is a 50× microscopic view of a Comparative cast lead metal alloy strip having 0.07% Ca, and 1.5% Sn.
Figure 6:
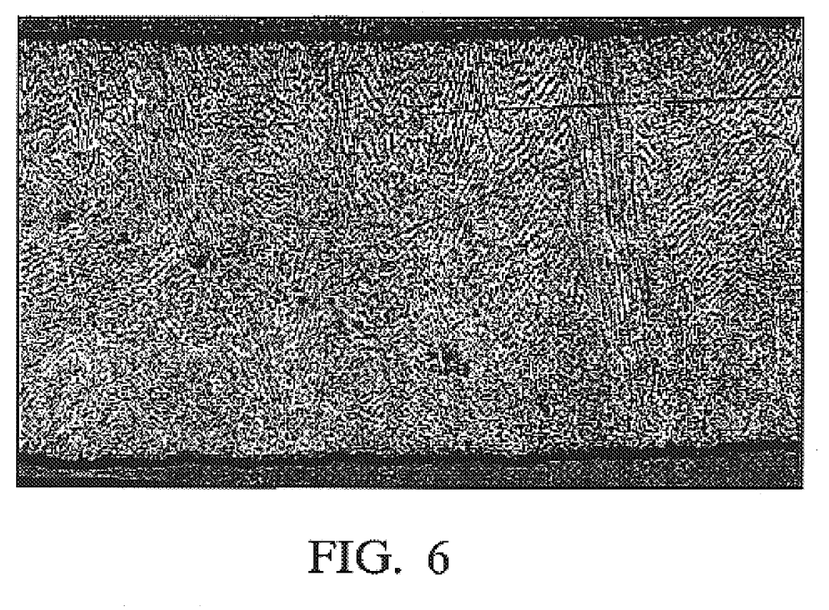
FIG. 6 is a 50× microscopic view of a Comparative cast lead metal alloy strip having 0.04% Ca, 0.5% Sn, and 0.04% Ag.
Figure 7:
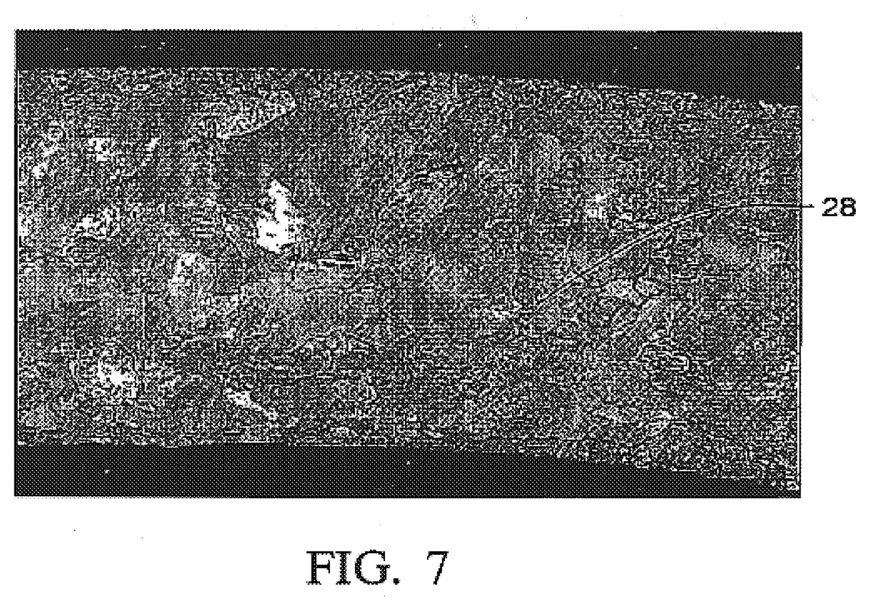
FIG. 7 is a 50× microscopic view of a lead metal alloy strip as shown in FIG. 6, after being compression rolled at a reduction ratio of 2:1, followed by heat-treatment at 150° C. for 16 hours
Figure 8:
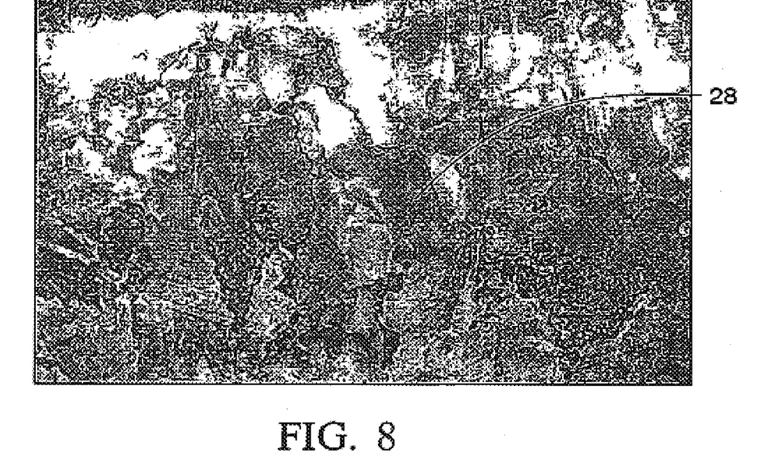
FIG. 8 is a 50× microscopic view of a lead metal alloy strip as shown in FIG. 6, after being compression rolled at a reduction ratio of 2:1, followed by heat-treatment at 240° C. for 5 minutes.

The effects of compression rolling on the microcrystalline structure of the metal strip and expanding on the microcrystalline structure of the grid are obvious upon visual comparison between, for example, a metal strip before and after being compression rolled. FIGS. 5 and 6 show Comparative Cast metal strips prior to being compression rolled or expanded. FIG. 4 shows the flow lines 26 that formed when the cast metal strips of FIG. 5 were compression rolled. The effects of heat treating on the microcrystalline structure of the compression rolled metal strip and/or expanded metal grid are also obvious upon visual comparison of the material before and after heat treating. FIGS. 7 and 8 clearly demonstrate the formation of equiaxial grains 28 in the heat treated metal strip as described herein, compared to the compression rolled metal strip shown in FIG. 4 prior to heat treating. The grain sizes can be controlled by the conditions of the rolling process, and heat treatment.

Figure 10:
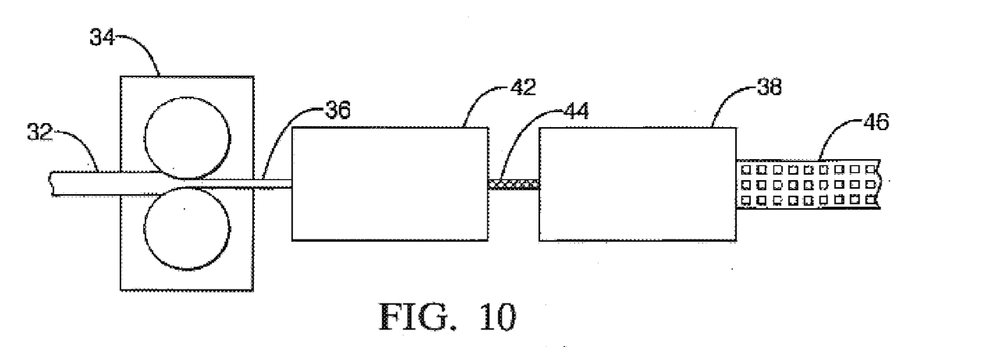
FIG. 10 is a schematic representation of an alternative process as described herein.

FIGS. 9 and 10 depict the two embodiments of the process by which the grids are formed. The metal strip 32 is put through a compression roller apparatus 34 to produce a rolled strip 36. FIG. 9 depicts an embodiment wherein the rolled strip 36 is expanded into a metal grid by an expansion apparatus 38 to produce a non-heat treated expanded grid 40 from the rolled strip 36. The grid is then heated in a heat treating apparatus 42 to form an expanded metal grid having an equiaxial grain structure within 46 as disclosed above.

In another embodiment as shown in FIG. 10 the rolled strip 36 is first heated in a heat treating apparatus 42 to produce a heat treated metal strip having an equiaxial grain structure within 44, which is then expanded into a metal grid having an equiaxial grain structure within 46 by an expansion apparatus 38 as disclosed above.

After the metal grid having an equiaxial grain structure within is formed, it is subjected to processing necessary to convert it grid-into a battery plate. As described above, the steps include pasting, steaming, curing, pickling and forming. Pasting includes covering the grid with a paste containing lead, typically lead metal along with lead containing compounds such as lead oxides, water, sulfuric acid, and other additives, which include, for example, sodium perbonate and fibers. Additives, when used, are present in the paste at most about 1%, preferably at most about 0.5%, with 0.25% by weight being most preferred. In a preferred embodiment, the paste includes at least about 75% by weight PbO, at least about 2.5% by weight sulfuric acid, and at least about 10% by weight water.

The paste is applied to the heat treated expanded metal grid (i.e., the grid is pasted) by wiping, extruding, coating and the like. Most preferably, the paste is applied in a continuous process. Once pasted, the grids may be flash dried by being briefly (20–30 seconds) subjected to hot air (about 300 to 600° C.) to remove excess surface water. Next, the pasted grid is "steamed" (e.g., 100° C. and 100% humidity) for a period of time (e.g., typically around 24 hours or more) to promote the growth of crystals within the pasted layer prior to curing, wherein the paste is "set" onto the grid surface.

Curing includes heating the pasted grid to a temperature at least about 35°, more preferably at least about 45°, with a temperature of at least about 50° C. being more desired. An upper temperature of about 75° can be employed, with an upper temperature of about 65° desired, and an upper temperature of about 55° C. more desired. Because curing requires water, the process is carried out at a relative humidity of at least about 10, more preferably at least about 15, with a relative humidity of at least about 20% being more desired. An upper relative humidity of about 100 can be employed, with an upper relative humidity of about 70 desired, and an upper relative humidity of about 50% more desired. The time required for the curing process depends on the curing temperature and humidity, as well as the composition of the past. A typical curing time is at least about 20, preferably at least about 30, most preferably at least about 40 hours. The curing step requires a time at most about 150, preferably at most about 120, more preferably at most about 90 hours.

After being assembled into a battery, the plates are pickled, followed by forming, wherein an external current converts a majority of the cured paste into PAM to complete the formation of the positive plate.

To evaluate a plate for high temperature suitability and performance, the J-240 testing protocol is conducted at 75° C. The J-240 protocol calls for plates to be assembled into a test battery, formed into a battery by a pre-defined procedure, and then evaluated by continued charging and discharging of a battery test cell at a specified temperature, until such time as the battery is no longer able to meet the minimum performance requirements. According to the test protocol, the test cell containing the electrodes and the electrolyte is kept at about 75° C. throughout, and the test battery, is first charged at 14.8 Volts with a limiting current of 25 Amps for 10 minutes, then discharged at 25 Amps constant current for a total of 4 minutes. This process is repeated for a total of 428 times per week. After each group of 428 cycles, the battery is left to stand at the specified temperature (e.g., 75° C.) for 66 hours prior to discharge. A battery is considered to have expired (i.e., battery failure) when the voltage measured 30 seconds into the discharge cycle is lower than 7.2 Volts.

The heat treated expanded metal grid described herein preferably has a failure at 75° C. using the J-240 test protocol of at least about 6 weeks, preferably at least about 7 weeks, with a failure of at least about 8 weeks being most preferred.

The following examples are presented in order that those skilled in the art may better understand how to practice the present invention. These examples are merely presented by way of illustration only, and are not intended to limit the invention thereto.

EXAMPLES

Example 1

Comparative Example 1

Comparative Example 1 represents an historical process of producing the grid, wherein a wrought lead alloy strip was compression rolled at a 20:1 compression ratio, and then expanded into a grid. The grid was then converted into a positive battery plate by pasting, drying, steaming, curing, pickling, and forming. Specifically: pure lead was converted into a 70–80% oxidized lead powder (lead oxide or leady oxide coating a metallic lead center) and was mixed with water and $H_2SO_4$ under constant stirring at an elevated temperature to form a lead-lead-oxide paste. Analysis of the paste showed a mixture of lead, lead oxide, lead sulfate, and basic lead sulfates such as $PbOPbSO_4$ (monobasic lead sulfate), $3PbOPbSO_4$ (tribasic lead sulfate), and $4PbOPbSO_4$ (tetrabasic lead sulfate). The paste was then applied to compression rolled, expanded wrought metal grids containing 98.4% lead, 0.07% calcium, and 1.5% tin. The pasted grids were then steamed for four hours at 100° C. and 100% humidity. After being steamed, the grids were cured for 3 days at 25% humidity and 50° C.

The cured (set) grids were assembled into a battery and then the battery was formed, ready for J-240 testing at 75° C. The results of the test are shown graphically in FIG. 11.

Example 2

Comparative Example 2

The plates were formed as described in Comparative Example 1 except that the paste was applied to an expanded metal grids formed from a cast metal strip containing 98.4% lead, 0.07% calcium, and 1.5% tin. Once the grids were converted into positive battery plates, the plates were assembled into a test battery for J-240 testing at 75° C. The results of the test are shown graphically in FIG. 11.

Example 3

Comparative Example 3

The plates were formed as described in Comparative Example 1 except that the paste was applied to expanded metal grids formed from cast metal strips containing 99% lead, 0.04% calcium, 0.5% tin, and 0.04% silver. Once the grids were converted into positive battery plates, the plates were assembled into a test battery for J-240 testing at 75° C. The results of the test are shown graphically in FIG. 11.

Example 4

Preferred Embodiment 1

Example 4 represents a preferred embodiment of a metal strip that was first compression rolled, heat-treated, and then expanded into a metal grid as described herein. The grids were the same in all respects to that used in Comparative Example 3 (i.e., expanded metal grids formed from cast metal strips containing 99% lead, 0.04% calcium, 0.5% tin, and 0.04% silver). However, the cast metal strips were compression rolled at a 2:1 compression ratio, and were then heat treated prior to expansion at 150° C. for 16 hours. Once the grids were converted into positive battery plates, the plates were assembled into a test battery for J-240 testing at 75° C. The results of the test are shown graphically in FIG. 11.

Figure 11:
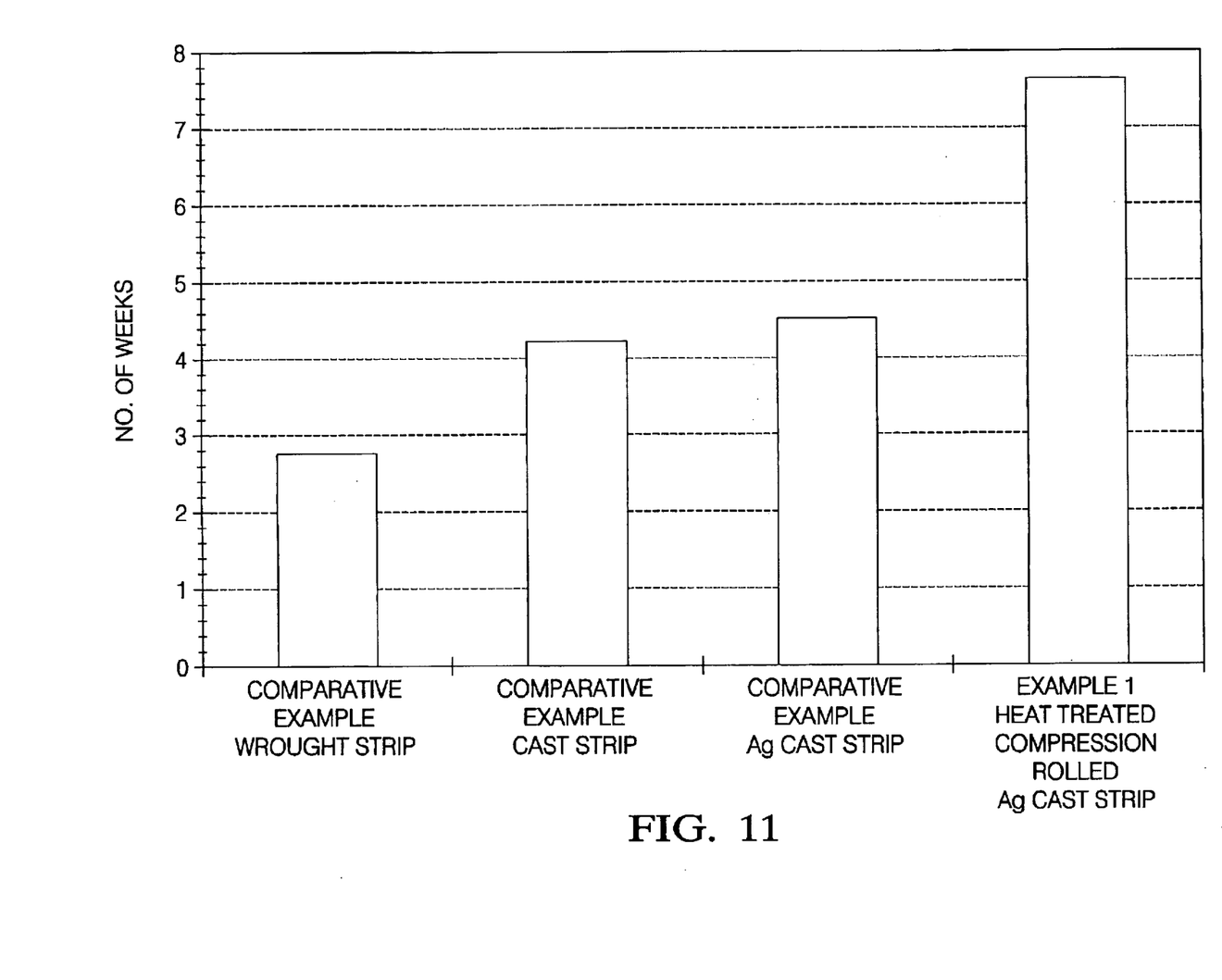
FIG. 11 is a graphical representation of J-240 testing of a grid as described herein compared to Comparative Example grids.

FIG. 11 clearly shows the improvement in J-240 testing at 75° C. that results from the above-described heat treatment of the grid. In fact, the data suggests a nearly two-fold improvement in so-called high temperature performance as a result of heat treatment of the metal strip after compression rolling.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. A method of making an expanded metal grid, comprising:
    compression rolling a metal strip at a reduction ratio from about 1.25 to 1, to about 25 to 1 to produce a rolled strip;
    heating said rolled strip at a temperature of at least about 125° C., and at most about 325° C. far at least about 30 seconds, to produce a heat treated metal strip having an equiaxial grain structure within; and
    expanding said heat treated metal strip to produce said expanded metal grid.

2. The method of claim 1, wherein said metal strip comprises lead.

3. The method of claim 2, wherein said metal strip further comprises tin, calcium, silver, or a combination comprising at least one of the foregoing.

4. The method of claim 3, wherein said metal strip comprises at least about 98% by weight lead, at least about 0.4% by weight tin, and at least about 0.01% by weight calcium.

5. The method of claim 4, wherein said metal strip further comprising at least about 0.01% by weight silver.

6. The method of claim 1, wherein said reduction ratio is between about 2 to 1, and about 5 to 1.

7. The method of claim 1, wherein said rolled strip is heated for at least about 1 minute, and at most about 24 hours.

8. The method of claim 1, wherein said rolled strip is heat treated at a temperature at between about 150° C., and about 240° C.

9. The method of claim 1, wherein said heat treated metal strip has a tensile strength between about 2,500 pounds per square inch, and about 8,000 pounds per square inch.

10. The method of claim 1, wherein said heat-treated metal strip has an average grain size of at least about 100, and at most about 500 microns.

11. The expanded metal grid of claim 1.

12. The expanded metal grid of claim 1, wherein said grid has an expiration of 6 weeks when evaluated according to test J-240 at 75° C.

13. The heat treated metal strip of claim 1.

14. A method of making an expanded metal grid, comprising:
    compression rolling a metal strip at a reduction ratio between about 1.25 to 1, and 25 to 1 to produce a rolled metal strip;
    expanding said rolled metal strip to produce an expanded metal grid; and
    heating said expanded metal grid at a temperature between about 125° C., and about 325° C. for at least about 30 seconds to produce an equiaxial grain structure within said metal grid.

15. The method of claim 14, wherein said metal strip comprises lead.

16. The method of claim 15, wherein said metal strip further comprises tin, calcium, silver, or a combination comprising at least one of the foregoing.

17. The method of claim 16, wherein said metal strip comprises at least about 98% by weight lead, at least about 0.4% by weight tin, and at least about 0.01% by weight calcium.

18. The method of claim 17, wherein said metal strip further comprising at least about 0.01% by weight silver.

19. The method of claim 14, wherein said reduction ratio is between about 2 to 1, and about 5 to 1.

20. The method of claim 14, wherein said rolled strip is heated for at least about 1 minute, and at most about 24 hours.

21. The method of claim 14, wherein said rolled strip is heat treated at a temperature at between about 150° C., and about 240° C.

22. The method of claim 14, wherein said heat treated metal strip has a tensile strength between about 2,500 pounds per square inch, and about 8,000 pounds per square inch.

23. The method of claim 14, wherein said heat-treated metal strip has an average grain size of at least about 100, and at most about 500 microns.

24. The expanded metal grid of claim 14.

25. The expanded metal grid of claim 14, wherein said grid has an expiration of 6 weeks when evaluated according to test J-240 at 75° C.

26. The method of claim 10, wherein said average grain size is at least about 150 micrometers.

27. The method of claim 10, wherein said average grain size is at most about 300 micrometers.

28. The method of claim 23, wherein said average grain size is at least about 150 micrometers.

29. The method of claim 23, wherein said average grain size is at most 300 micrometers.

30. The method of claim 1, wherein said expanded metal grid does not contain antimony.

31. The method of claim 14, wherein said expanded metal grid does not contain antimony.

32. A method of making an expanded metal grid, consisting of:

compression rolling a metal strip at a reduction ratio from about 1.25 to 1, to about 25 to 1 to produce a rolled strip;

heating said rolled strip at a temperature of at least about 125° C., and at most about 325° C. for at least about 30 seconds, to produce a heat treated metal strip having an equiaxial grain structure within; and expanding said heat treated metal strip to produce said expanded metal grid.

33. A method of making an expanded metal grid, comprising:

compression rolling a metal strip at a reduction ratio from about 1.25 to 1, to about 25 to 1 to produce a rolled strip;

heating said rolled strip at a temperature of at least about 125° C., and at most about 325° C. for at least about 30 seconds, to produce a heat treated metal strip having an equiaxial grain structure within; and expanding said heat treated metal strip without quenching to produce said expanded metal grid.

* * * * *